United States Patent
Ash et al.

(10) Patent No.: US 9,996,476 B2
(45) Date of Patent: Jun. 12, 2018

(54) MANAGEMENT OF CACHE LISTS VIA DYNAMIC SIZING OF THE CACHE LISTS

(71) Applicant: International Business Machines Corporation, Armonk, NY (US)

(72) Inventors: Kevin J. Ash, Tucson, AZ (US); Lokesh M. Gupta, Tucson, AZ (US); Matthew J. Kalos, Tucson, AZ (US); Rose L. Manz, Forked River, NJ (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 14/845,204

(22) Filed: Sep. 3, 2015

(65) Prior Publication Data

US 2017/0068624 A1    Mar. 9, 2017

(51) Int. Cl.
*G06F 12/122*   (2016.01)
*G06F 12/128*   (2016.01)
*G06F 12/123*   (2016.01)

(52) U.S. Cl.
CPC .......... *G06F 12/122* (2013.01); *G06F 12/123* (2013.01); *G06F 12/128* (2013.01)

(58) Field of Classification Search
None
See application file for complete search history.

(56) References Cited

U.S. PATENT DOCUMENTS

| | | |
|---|---|---|
| 4,509,119 A | 4/1985 | Gumaer et al. |
| 5,134,563 A | 7/1992 | Tayler et al. |
| 6,049,850 A | 4/2000 | Vishlitzky et al. |
| 6,823,428 B2 | 11/2004 | Rodriguez et al. |
| 7,464,246 B2 | 12/2008 | Gill et al. |
| 7,509,470 B2 | 3/2009 | Gill et al. |
| 7,707,382 B2 | 4/2010 | Gill et al. |
| 8,832,377 B2 | 9/2014 | Benhase et al. |

OTHER PUBLICATIONS

"Concerning Caches". University of Washington. Published Spring 2002. <https://courses.cs.washington.edu/courses/cse378/02sp/section/section9-2.html>.*
Munster, Jason. "Base load electricity vs Peak Load". Published Dec. 17, 2012. <http://www.jasonmunster.com/baseload-peakload/>.*
Gill et al., "SARC: Sequential Prefetching in Adaptive Replacement Cache," 2005 USENIX Annual Technical Conference Apr. 10-15, 2005, pp. 293-308.

(Continued)

*Primary Examiner* — Charles Rones
*Assistant Examiner* — Hewy H Li
(74) *Attorney, Agent, or Firm* — Zilka-Kotab, P.C.

(57) ABSTRACT

A process for caching data according to one embodiment includes maintaining a random data list and a sequential data list, and dynamically establishing a desired size of the sequential data list. Dynamically establishing the desired size of the sequential data list includes increasing the desired size of the sequential data list in response to at least one of: detecting a hit on a bottom of the sequential data list, and detecting a read miss on sequential tracks. Dynamically establishing the desired size of the sequential data list also includes decreasing the desired size of the sequential data list in response to detecting a hit on a bottom of the random data list.

18 Claims, 8 Drawing Sheets

(56) References Cited

OTHER PUBLICATIONS

Gill et al., "AMP: Adaptive Multi-stream Prefetching in a Shared Cache," FAST '07: 5th USENIX Conference on File and Storage Technologies, Feb. 13-16, 2007, pp. 185-198.
Liang et al., "STEP: Sequentiality and Thrashing Detection Based Prefetching to Improve Performance of Networked Storage Servers," 27th International Conference on Distributed Computing Systems, Jun. 25-27, 2007, 10 pages.

* cited by examiner

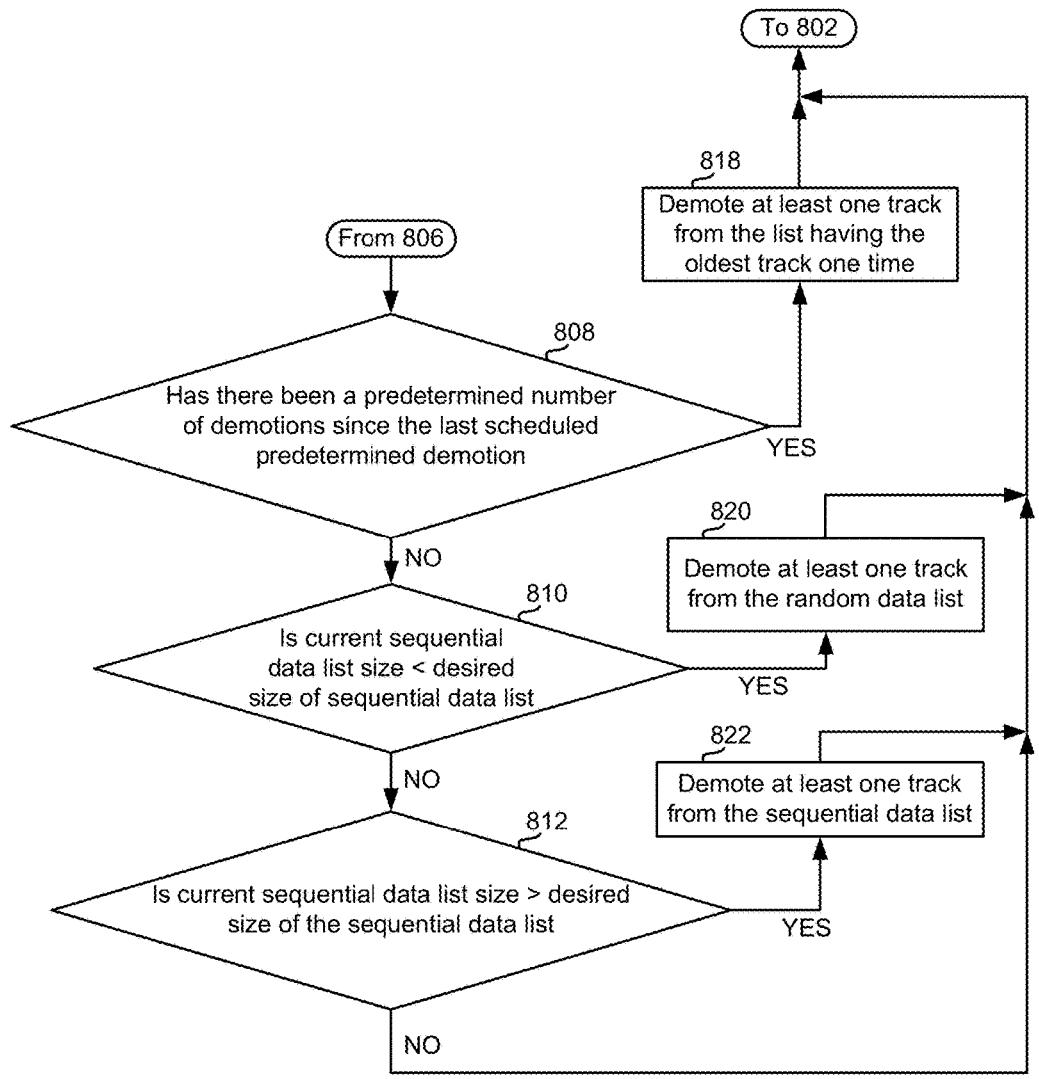
FIG. 8 (contin.)

MANAGEMENT OF CACHE LISTS VIA DYNAMIC SIZING OF THE CACHE LISTS

BACKGROUND

The present invention relates to data caching, and more specifically, this invention relates to cache list size prioritization.

A cache may include a high speed memory or storage device that is used to reduce the effective time taken to read data from or write data to a lower speed memory or device. A modern storage controller cache typically contains volatile memory used as a read cache and a non-volatile memory used as a write cache. The effectiveness of a read cache may correspond to the "hit" ratio, or the fraction of requests that are served from the cache without necessitating a disk trip (which represents a "miss" in finding data in the cache).

BRIEF SUMMARY

A method for caching data according to one embodiment includes maintaining a random data list and a sequential data list, and dynamically establishing a desired size of the sequential data list. Dynamically establishing the desired size of the sequential data list includes increasing the desired size of the sequential data list in response to at least one of: detecting a hit on a bottom of the sequential data list, and detecting a read miss on sequential tracks. Dynamically establishing the desired size of the sequential data list also includes decreasing the desired size of the sequential data list in response to detecting a hit on a bottom of the random data list.

A computer program product for cache size prioritization includes a computer readable storage medium having program instructions embodied therewith, the program instructions readable and/or executable by a computer to cause the computer to perform the foregoing method.

A system according to one embodiment includes a cache comprising memory, and a processor and logic integrated with and/or executable by the processor. The logic is configured to enable performance of the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for management of one or more data caches by dynamically adjusting cache list sizes. These data caches may cache data from memory, e.g., in Redundant Array of Independent Disks (RAID)-based systems, database systems, other systems that may allocate space for variable-sized data objects, etc. Embodiments described herein provide management of data caches based on hit and miss accessing events while caching data from memory.

In one general embodiment, a method for caching data includes maintaining a random data list and a sequential data list, and dynamically establishing a desired size of the sequential data list. Dynamically establishing the desired size of the sequential data list includes increasing the desired size of the sequential data list in response to at least one of: detecting a hit on a bottom of the sequential data list, and detecting a read miss on sequential tracks. Dynamically establishing the desired size of the sequential data list also includes decreasing the desired size of the sequential data list in response to detecting a hit on a bottom of the random data list.

In another general embodiment, a computer program product for cache size prioritization includes a computer readable storage medium having program instructions embodied therewith, the program instructions readable and/or executable by a computer to cause the computer to perform the foregoing method.

In another general embodiment, a system includes a cache comprising memory, and a processor and logic integrated with and/or executable by the processor. The logic is configured to enable performance of the foregoing method.

Figure 1:
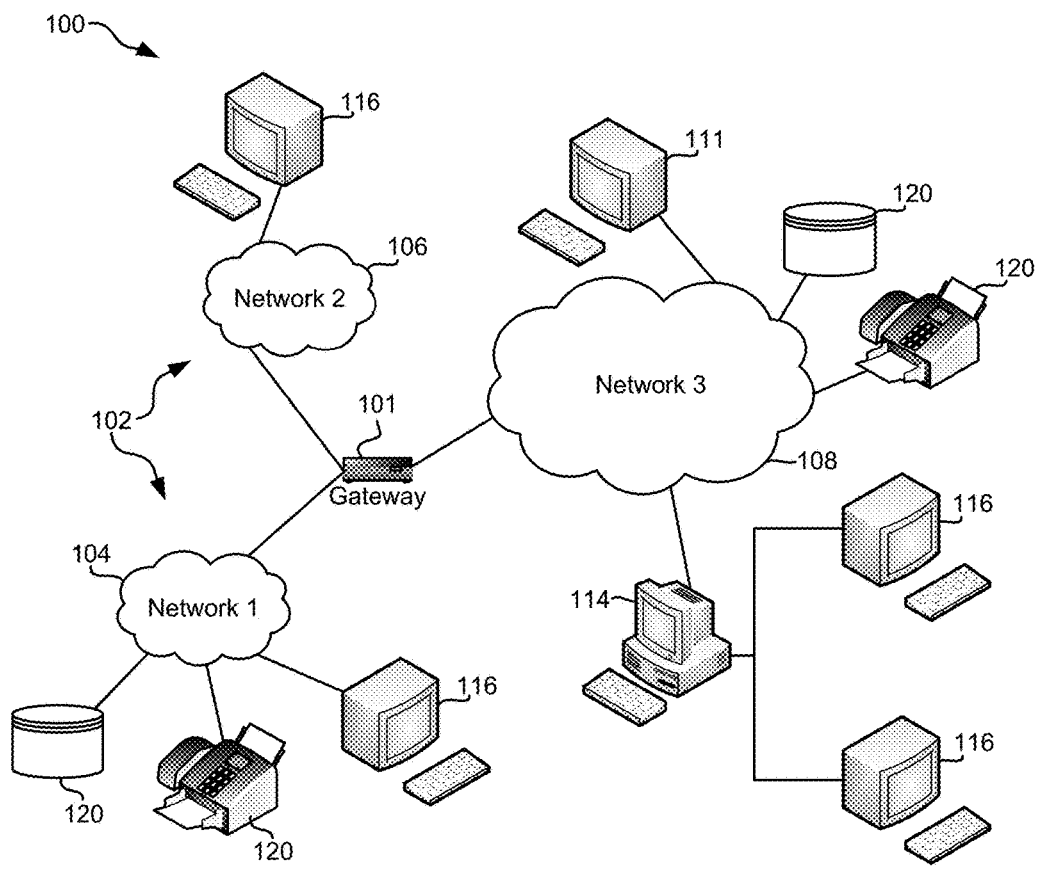
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
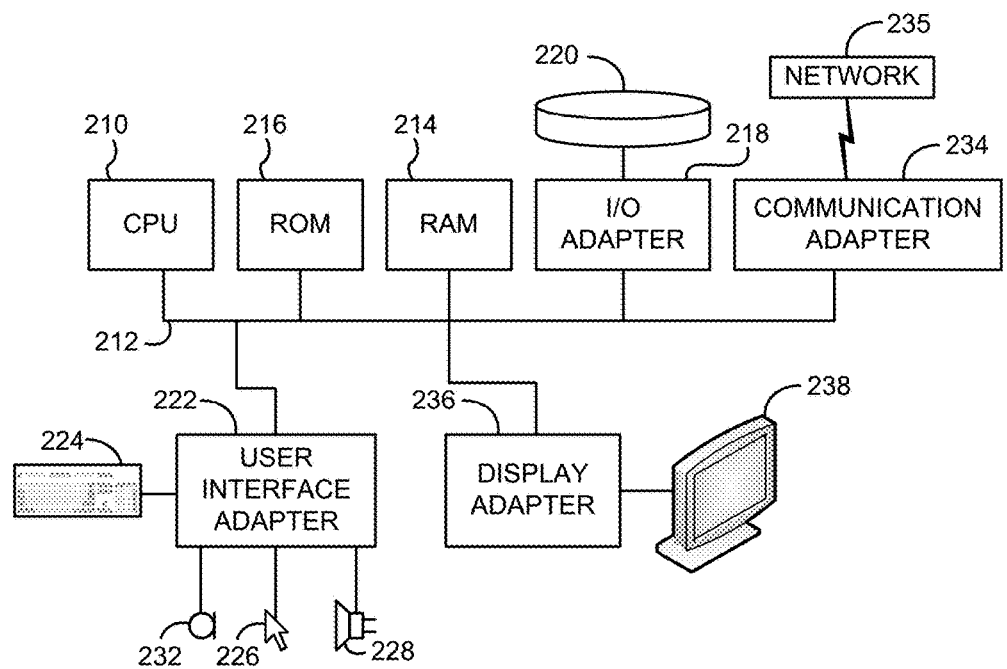
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
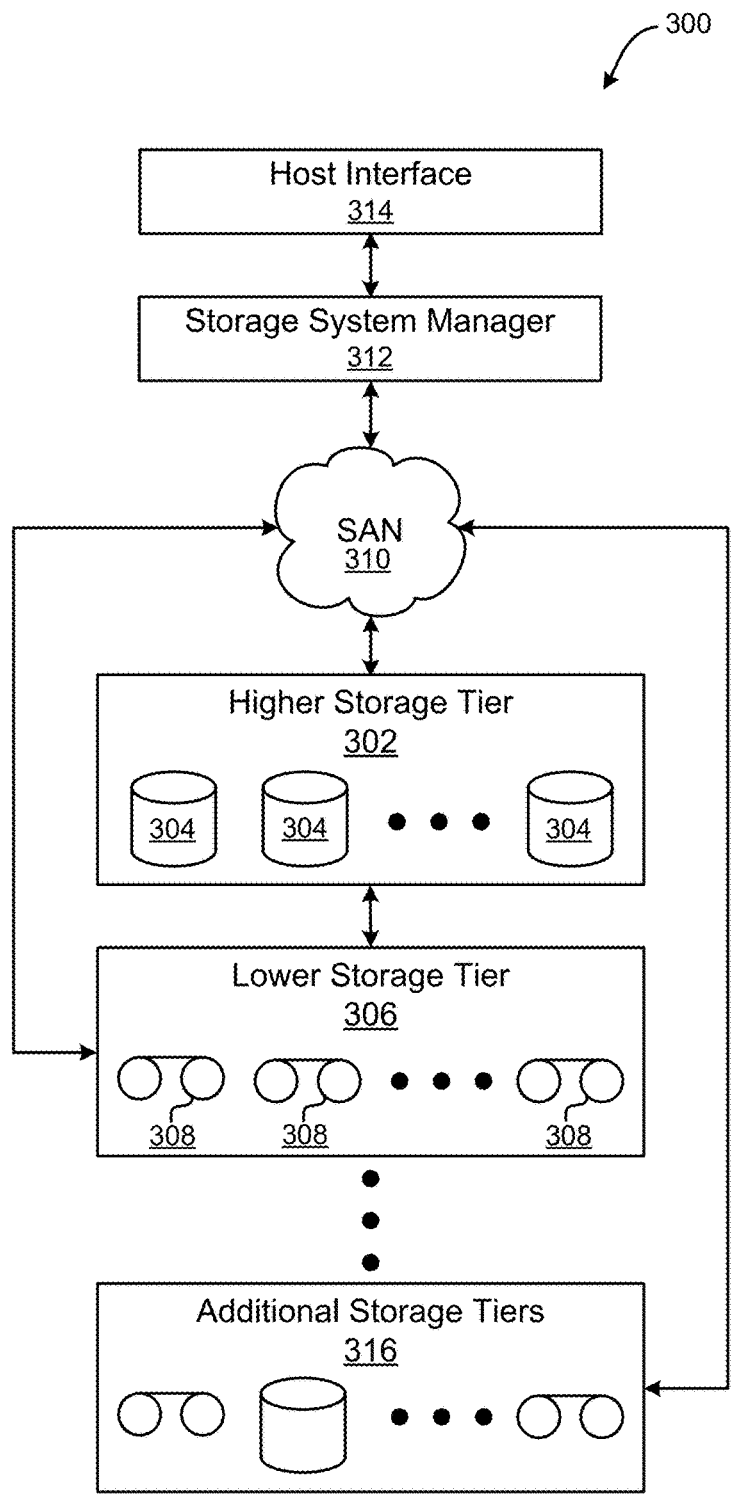
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

With continued reference to data storage, data caching may be implemented in data storage systems, e.g., the tiered data storage system 300, as a technique for reducing delays in writing data to, and reading data from, storage, e.g., hard disk drive storage. These delays can be referred to as input/output (I/O) latency. Because caching may effectively hide I/O latency, data caching may improve performance when implemented in data storage components, e.g., storage controllers, storage drives, databases, file systems, operating systems, etc.

A cache may be defined as a high speed memory or storage device that may reduce the effective time taken to read data from and/or write data to a relatively lower speed memory and/or device. In some approaches, a storage controller cache may contain volatile memory used as a read cache and a non-volatile memory used as a write cache. The effectiveness of a read cache may be determined by a "hit" ratio. A hit ratio may be the fraction of requests that are served from the cache without necessitating retrieval from the lower speed storage (which may represent a "miss" in finding data in the cache).

Cache may be managed in uniformly sized units called tracks. Demand paging may include a track being copied into cache from the slower memory (e.g., a disk) for example in the event of a cache miss of the track, e.g., if the track was requested by the host and the track could not be found in cache, and therefore necessitating a relatively slower access to the lower speed memory and/or device. By way of example only, and solely to provide a context for various concepts described herein, a relatively slower access to the lower speed memory and/or device may be referred to herein as a "disk fetch."

In demand paging, cache management may seek to methodically select a track from cache for replacement when the cache is full and a new track is to be stored in cache owing to a "miss".

In addition to demand paging, further improvement can be made in reducing I/O latency by speculatively prefetching or prestaging tracks. Relatively complex algorithms have attempted to predict when a track will be requested, but commercial systems have rarely used such schemes because sophisticated prediction schemes may call for an extensive history to be kept of track accesses. This is cumbersome and expensive. Furthermore, to be effective, a prefetch may need to be complete before the predicted request. Performing a prefetch before the predicted request may include sufficient prior notice that may not be feasible and/or functionally practical. Furthermore, long-term predictions may be initially inaccurate and may become even more inaccurate with the interleaving between a large number of different workloads, e.g., other processing tasks. Finally, for a disk subsystem operating near its peak capacity, average response time may increase drastically with the increasing number of disk fetches, and, hence, low accuracy predictive prefetching which results in an increased number of disk fetches can worsen the performance.

Data caching described herein may include the principle of sequentiality to increase track hit accuracy. Sequentiality is a characteristic of demanded data (e.g., data to be read) in which consecutively numbered tracks are arranged in ascending order without gaps. Sequential data caching may functionally utilize only a very small amount of history information, and may be capable of attaining a nearly 100% track prediction accuracy, e.g. in the sequential access of videos-on-demand, during database scans, during recovery operations, etc.

When synchronous and asynchronous prefetching strategies are used along with the least recently used-(LRU)-based caching, and an asynchronous trigger track is accessed, an asynchronous prefetch of the next group of tracks may occur. In an LRU-based cache, these newly fetched group of tracks along with the asynchronous trigger track may be placed at the MRU end of the list. The unaccessed tracks within the current prefetch group may additionally remain where they were in the LRU list, e.g., potentially near the LRU end of the list. These unaccessed tracks within the current prefetch group may be accessed before the tracks in the newly prefetched group, and therefore, depending upon the amount of cache space available for sequential data, some of these unaccessed tracks may be evicted from the cache before they are accessed. This may undesirably result in a sequential miss. Because these sequential misses may repeatedly occur, employing asynchronous prefetching may not be desirable.

Furthermore, when LRU-based caching is implemented in conjunction with the above described data caching embodiments, the stack property may be non-functional. As a result when the amount of cache space available to sequentially prefetched data increases, the occurrence of sequential misses may likely not decrease. Because the stack property may be an important functionality in proper cache management, this may be a further undesirable outcome.

In view of the above problems, embodiments described herein improve cache management and/or the performance of a read cache, e.g., increase the hit ratio and/or equivalently minimize the miss ratio.

An illustrative system which may include data caches will now be detailed below.

Figure 4:
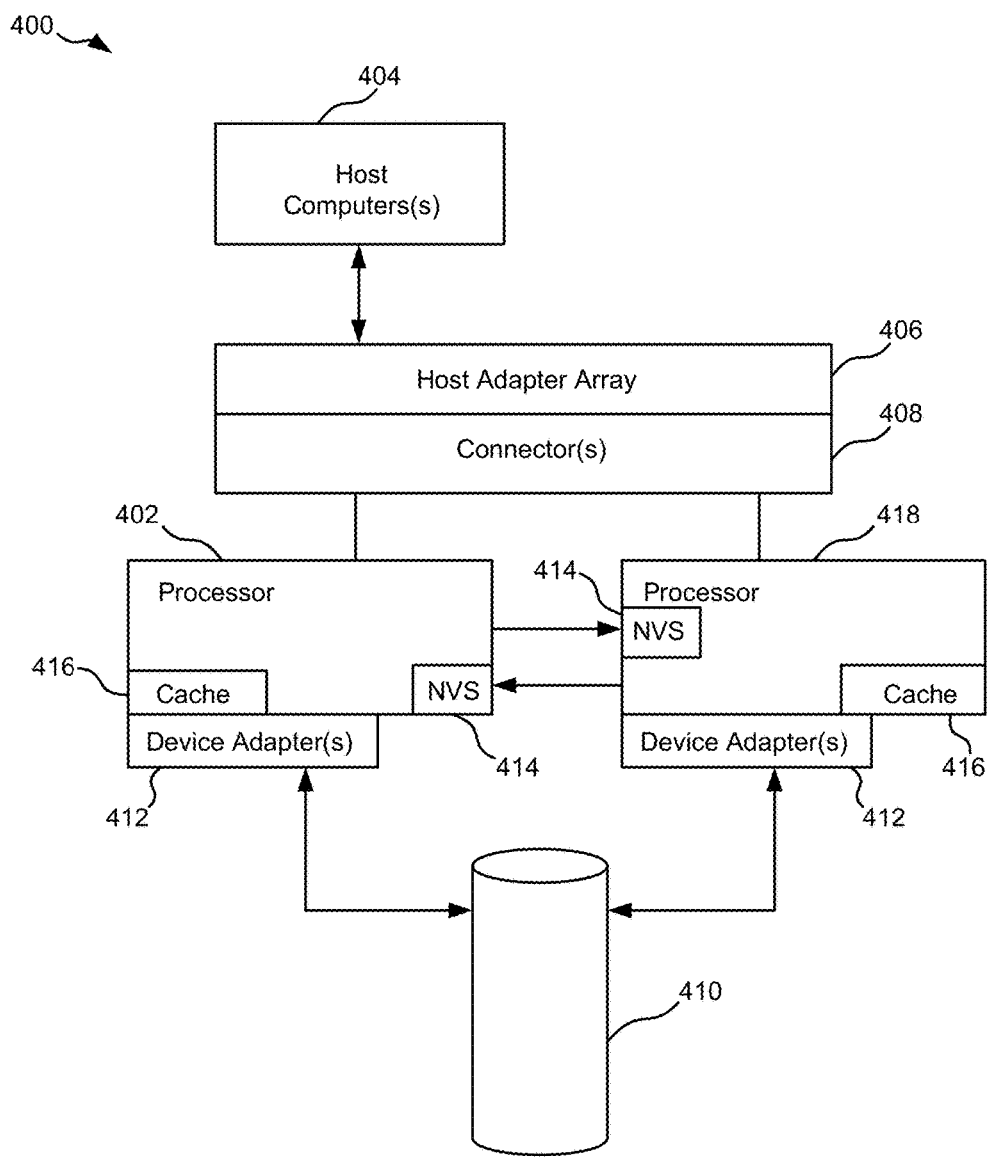
FIG. 4 is a system architecture, in accordance with one embodiment.

FIG. 4 depicts a system 400 in accordance with one embodiment. As an option, the present system 400 may be implemented in conjunction with features from any other embodiment listed herein, such as those described with reference to the other FIGS. Of course, however, such system 400 and others presented herein may be used in various applications and/or in permutations which may or may not be specifically described in the illustrative embodiments listed herein. Further, the system 400 presented herein may be used in any desired environment.

Referring now to FIG. 4, system 400 includes a first processor 402, and a second processor 418. The processors 402, 418 may communicate with one or more host computers 404 via an array 406 of host adapters with associated connectors 408. The array 406 of host adapters and associated connectors 408 may be of a type known in the art, and furthermore may vary in type depending on the preferred embodiment. Furthermore, the processors 402, 418 may communicate with data storage, e.g., such as a RAID-configured disk storage system 410, via respective device adapters 412. One or more non-volatile storages (NVS) 414 and/or one or more data cache 416 (preferably solid state-implemented) may be coupled to respective processors 402, 418, for communication and/or storage purposes. For example, the NVS 414 and/or data cache 416, may establish a communication pathway that allows for the first processor 402 to receive communication from the second processor 418, or vice versa.

The processors 402, 418 may additionally be programmed to execute logic. The flow charts and embodiments described herein illustrate the structure of the present logic executed by the processor(s) 402 as embodied in computer program software. Those skilled in the art will appreciate that the flow charts and embodiments described herein illustrate structures of logic elements, e.g., such as computer program code elements or electronic logic circuits. Preferred embodiments described herein may be practiced by a machine component that renders the logic elements in a form that instructs a digital processing apparatus, e.g., such as a computer, to perform a sequence of function steps corresponding to those shown.

In the non-limiting implementation shown, each cache 416 has a capacity of several gigabytes (GB) (per cluster), each NVS 414 has a capacity of several GB (per cluster), four CPUs (per cluster) may be used, and sixteen RAID-5 (6+parity+spare) arrays with disk drives may be used in the data storage 410. The host computer 404 may be connected to the processors 402 through two fiber channel cards implementing the host adaptor array 406.

Figure 5:
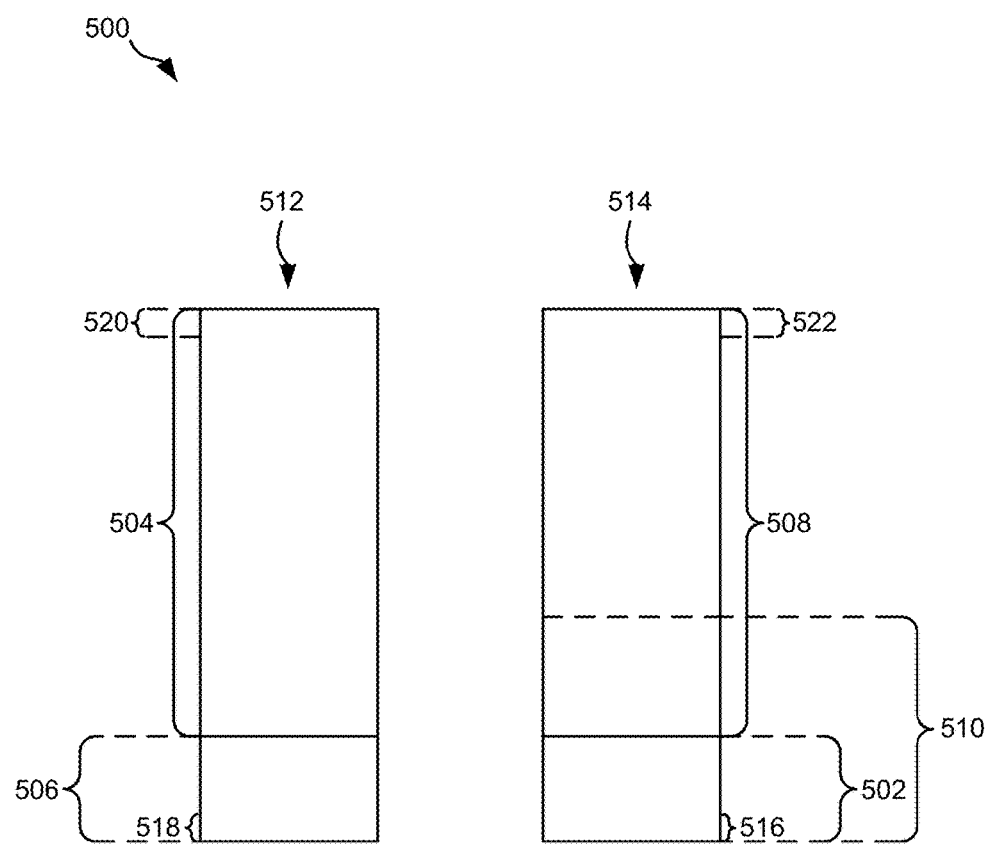
FIG. 5 illustrates cache lists, in accordance with one embodiment.

FIG. 5 depicts cache lists 500 in accordance with one embodiment. As an option, the present cache lists 500 may be implemented in conjunction with features from any other embodiment listed herein, such as those described with reference to the other FIGS. Of course, however, such cache lists 500 and others presented herein may be used in various applications and/or in permutations which may or may not be specifically described in the illustrative embodiments listed herein. Further, the cache lists 500 presented herein may be used in any desired environment.

Referring now to FIG. 5, cache lists 500 may represent illustrative lists of the cache 416 of system 400. Cache lists 500 may preferably include two or more stacked lists, e.g., such as a random data list 512 and a sequential data list 514.

The random data list 512 may list cached track(s) that have been randomly accessed pursuant to, e.g., a read demand, a previous read history access, an access demand of a type known in the art, etc. The random data list 512 may include an upper portion 504 and a bottom 506. The upper portion 504 and the bottom 506 may each include one or more tracks. For example, the bottom 506 of the random data list 512 may include, e.g., one track, multiple tracks, etc. The bottom 506 may include an oldest track 518 (may also be referred to as a least recently used (LRU) track). The oldest track 518 of the random data list 512 may be located in the lowermost track slot of the bottom 506. The upper portion 504 of the random data list 512 may include a newest track 520 (may also be referred to as a most recently used (MRU) track) in the uppermost track position of the upper portion 504. According to various embodiments, the bottom 506 of the random data list 512 may correspond to a bottom percentile of the random data list 512. The bottom percentile may be predefined, e.g., by a user or vendor; may be determined based on performance characteristics, e.g., during performance tuning; etc. In some approaches, the bottom percentile may be in about a bottom 5% or less of tracks of the random data list 512, the bottom 2% or less of the tracks, etc. According to further embodiments, the location of the oldest track 518 and/or the newest track 520 of the random data list 512 may vary.

The sequential data list 514 may maintain a list of tracks that were cached pursuant to speculative sequential caching, sequential read demands, a cache access of a type known in the art, etc. Similar to the random data list 512, the sequential data list 514 may include an upper portion 508 and a bottom 502. The upper portion 508 and the bottom 502 may each include one or more tracks. For example, the bottom 502 of the sequential data list 514 may include, e.g., one track, multiple tracks, etc. The bottom 502 of the sequential data list 514 may correspond to a bottom percentile of the sequential data list 514. The bottom percentile may be predefined, e.g., by a user or vendor, may be determined based on performance characteristics, e.g., during performance tuning; etc. According to various embodiments, the bottom 502 of the sequential data list 514 may be in a range of less than about a bottom 5% of the sequential data list 514. According to further embodiments, the bottom 502 of the sequential data list 514 may be in a range of less than or equal to a bottom 2% of the sequential data list 514.

The bottom 502 of the sequential data list 514 may furthermore include an oldest track 516 (may also be referred to as a least recently used (LRU) track). The oldest track 516 of the sequential data list 514 may preferably be located in the lowermost track position of the bottom 502. According to various embodiments, the bottom 502 may be a predefined bottom percentile of tracks of the sequential data list 512. According to further embodiments, the location of the oldest track 516 and the newest track 522 of the sequential data list 514 may vary.

It should be noted that newly prefetched tracks and/or asynchronous trigger tracks in the current group of tracks may be added to the upper portion 508, and/or preferably the newest track 522 of the sequential data list 514. Additionally, one or more unaccessed tracks in the current group of tracks may also be moved to the upper portion 508 and/or the newest track 522 of the sequential data list 514. Moving these tracks to the upper portion 508, and/or preferably the newest track 522 of the sequential data list 514 may enable asynchronous prefetching and/or increase overall cache performance, e.g., increase the hit ratio, decrease the miss ratio, increase overall track access request accuracy, etc.

The sequential data list 514 may also include a desired size 510. The desired size 510 may establish a minimum size of the sequential data list 514, e.g., a minimum size before the sequential data list 514 is demoted to a size that causes an increase in the miss ratio. Alternatively, the desired size 510 may establish a maximum or preferred size of the sequential data list 514. According to various embodiments, the desired size 510 of the sequential data list 514 may include one or more tracks that are located in the bottom 502 of the sequential data list 514 and/or one or more tracks that are not located in the bottom 502 of the sequential data list 514, e.g., one or more tracks that are located above the bottom 502.

A preferred method of dynamically partitioning the amount of cache space among the sequential data list 514 and the random data list 512 and thereby establish adaptive, self-tuning, low overhead cache management by minimizing the overall miss rate will be described by method 600.

Figure 6:
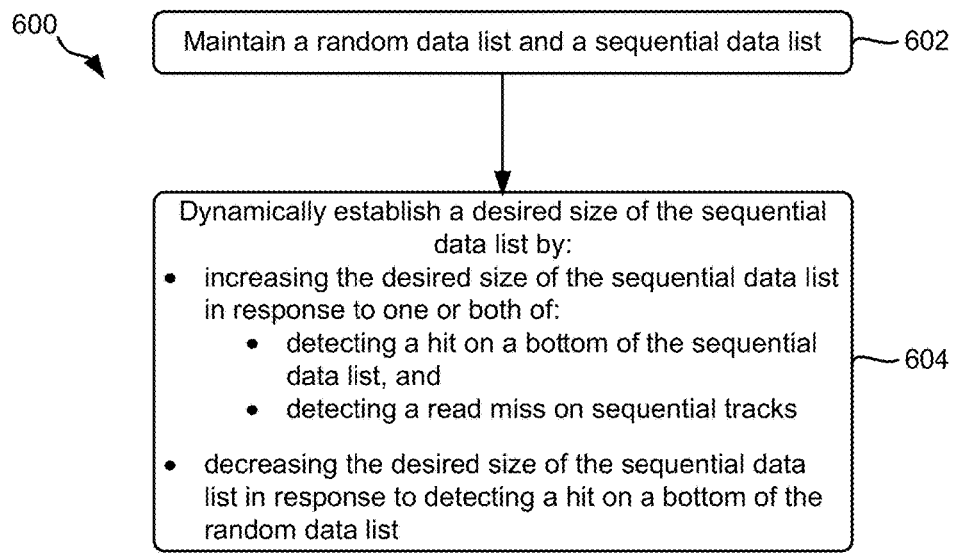
FIG. 6 illustrates a flowchart of a method for caching data, in accordance with one embodiment.

Now referring to FIG. 6, a flowchart of a method 600 for caching data is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

It should be noted that the descriptions of method 600 may include numbering and/or reference to the sequential data list 514 and random data list 512 of FIG. 5 for illustrative purposes. Accordingly method 600 should not be interpreted to be functional only in the environment of FIG. 5.

Referring now to FIG. 6, operation 602 includes maintaining a random data list and a sequential data list, e.g. such as the random data list 512 and the sequential data list 514 of FIG. 5. Maintaining a random data list and a sequential data list may include keeping random tracks on the random data list and keeping sequential tracks on the sequential data list. The content and/or size of the random data list and/or the sequential data list may be adjusted according to conditions that are described in greater detail elsewhere herein.

Operation 604 includes dynamically establishing a desired size of the sequential data list. The desired size of the sequential data list may be dynamically established, e.g., by predefined conditions, by data list size trigger conditions, by comparator logic, etc. Dynamically establishing the desired size of the sequential data list may desirably increase the performance of a read cache, e.g., increase the hit ratio and/or equivalently minimize the miss ratio. Various embodiments of dynamically establishing the desired size of the sequential data list are described below, and include increasing the desired size of the sequential data list in response to one or both of: detecting a hit on a bottom of the sequential data list, and detecting a read miss on sequential tracks; and decreasing the desired size of the sequential data list in response to detecting a hit on a bottom of the random data list.

Referring momentarily to FIG. 5, dynamically establishing the desired size 510 of the sequential data list 514 may preferably include increasing the desired size 510 of the sequential data list 514 in response to detecting a hit on the bottom 502 of the sequential data list 514. The increase in the desired size 510 of the sequential data list 514 may be a fixed incremental increase, e.g., one track, two tracks, any number of tracks, etc. Furthermore, the increase in the desired size 510 of the sequential data list 514 may vary between different detections of a hit on the bottom 502 of the sequential data list 514.

Increasing the desired size 510 of the sequential data list 514 in response to detecting a hit on the bottom 502 of the sequential data list 514 may desirably prevent the sequential data list 514 from being demoted to a size that would decrease cache performance, e.g., decrease the hit ratio, increase the miss ratio, decrease overall track access request accuracy, etc.

Various embodiments overcome a problem discovered by the inventors where the sequential data list 514 was demoted to a non-preferred size when considering a batch job, where tracks are first read sequentially. Because these tracks were now prefetched, the sequential miss rate on these sequential data tracks was almost zero. However, where the batch job accesses these tracks randomly, though these tracks would be a hit on a sequential data list, only hits on the random data list are taken into account. The result is that the sequential data list remains undesirably small, and random accesses of the sequential tracks are considered misses. This in turn resulted in random decreases in cache performance, e.g., detections of a hit on the bottom 502 of the sequential data list 514, accesses on sequential tracks to be misses, batch job(s) to be relatively slow, etc.

A detected hit on the bottom 502 of the sequential data list 514, e.g. such as a hit in a predefined bottom percentile of the sequential data list 514, may occur in response to the sequential data list 514 containing too few tracks, e.g., a number of tracks that does not sufficiently maintain cache performance, a number of tracks that may result in the sequential data list 514 running out of tracks, a number of tracks that causes the sequential data list 514 to have fewer tracks than a predefined minimum, etc. As detailed above, the desired size 510 of the sequential data list 514 may be increased to prevent and/or decrease the occurrence of at least these issues.

Dynamically establishing the desired size 510 of the sequential data list 514 may further include increasing the desired size 510 of the sequential data list 514 in response to detecting a read miss on sequential tracks. As described above, the increase in the desired size 510 of the sequential data list 514 may be a fixed incremental increase, e.g., one track, two tracks, any number of tracks, etc. Furthermore, the increase in the desired size 510 of the sequential data list 514 may vary between different detections of a read miss on sequential tracks.

A detected read miss on sequential tracks may result from the sequential data list 514 contains too few tracks. Increasing the desired size 510 of the sequential data list 514 in response to detecting a read miss on sequential tracks may decrease the probability of a read miss occurring due to the cache containing at least one more sequential track in at least the subsequent read event. Decreasing the probability of a read miss occurring may furthermore establish an optimal read performance in systems which maintain a random data list and a sequential data list, e.g. such as system 200, system 300, architecture 400, etc. Decreasing the probability of a read miss occurring may establish an optimal read performance due to requested memory being available for access in cache rather than having to fetch the requested memory from relatively slower storage, e.g., see RAID-configured disk storage system 410 of system 400.

Dynamically establishing the desired size 510 of the sequential data list 514 may further include decreasing the desired size 510 of the sequential data list 514 in response to detecting a hit on a bottom 506 of the random data list 512.

Similar to increasing the desired size 510 of the sequential data list 514 in response to detecting a hit on the bottom 502 of the sequential data list 514, decreasing the desired size 510 of the sequential data list 514 in response to detecting a hit on a bottom 506 of the random data list 512 may desirably prevent the random data list 512 from being demoted to a size that would decrease cache performance, e.g., decrease the hit ratio, increase the miss ratio, decrease overall track access request accuracy, etc.

Further illustrative embodiments of operations for increasing and/or decreasing of the desired size 510 of the sequential data list 514 are described below for further illustration, e.g., see FIG. 7.

Figure 7:
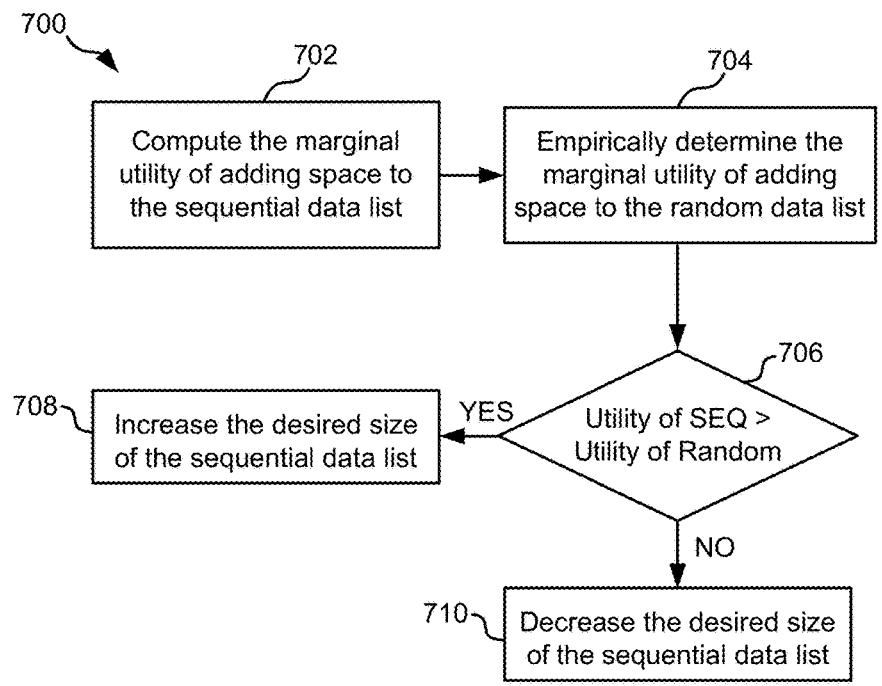
FIG. 7 illustrates a flowchart of a method for partitioning cache space, in accordance with one embodiment.

Now referring to FIG. 7, a flowchart of a method 700 for partitioning cache space is shown according to one embodiment. The method 700 may be performed in accordance with the present invention in any of the environments depicted in FIGS. 1-5, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

Now referring to FIG. 7, an adaptive, self-tuning, low overhead method 700 is shown for dynamically partitioning the amount of cache space among the sequential data list and the random data list to increase cache performance and/or accuracy.

Operation 702 includes computing the marginal utility of adding space to the sequential data list. The marginal utility may be a measure of the rate of change of sequential cache misses as the size of the sequential data list changes. According to one embodiment, the marginal utility of operation 702 may computed to be between s/L and 2 s/L, where "s" may represent the rate of misses from sequential cache for synchronous and asynchronous prefetching and "L" may represent the length of the sequential data list, e.g., such as in 4 KB pages. According to various embodiments, the marginal utility may preferably be chosen to be 2 s/L. According to further embodiments, "s" may be the sum over one or more streams of the respective rates of sequential cache misses for synchronous and asynchronous prefetching. The "s" may be easily observable in the cache. This "marginal utility" may be regarded as a measure of how the rate of sequential cache misses changes as the size of the list changes.

Operation 704 includes empirically determining the marginal utility of adding space to the random data list. The marginal utility may be a measure of the rate of change of sequential cache misses as the size of the random data list changes. According to one embodiment, the marginal utility of operation 704 may computed to be l/ΔL, where "ΔL" is the length of the bottom-most portion of the random data list during a time period defined by two successive cache hits in the bottom-most portion of the random data list. According to various embodiments, the time period of sampling for the empirical determinations of operation 704 may vary according to operating conditions. According to further embodiments, a fixed time period may also and/or alternatively be used in the empirical determinations of operation 704.

Determination 706 includes determining if the marginal utility of adding space to the sequential data list is greater than the marginal utility of adding space to the random data list, e.g., based on the computation of operation 702 and the empirical determination of operation 704. Determination 706 may be used to determine if the desired size of the sequential data list should be increased or decreased, e.g., to decrease the overall miss rate in the data cache.

In response to the marginal utility of adding space to the sequential data list being determined to be greater than the marginal utility of adding space to the random data list (as noted by the "YES" logic leading from determination 706), operation 708 includes increasing the desired size of the sequential data list.

In response to the marginal utility of adding space to the sequential data list being determined to be not greater than, e.g., less than or equal to, the marginal utility of adding space to the random data list (as noted by the "NO" logic leading from determination 706), operation 710 includes decreasing the desired size of the sequential data list.

In response to the cache needing segments, e.g., in response to a read and/or write request from a host, demotions may be made from the sequential data list to the random data list and/or from the random data list to the sequential data list.

Figure 8:
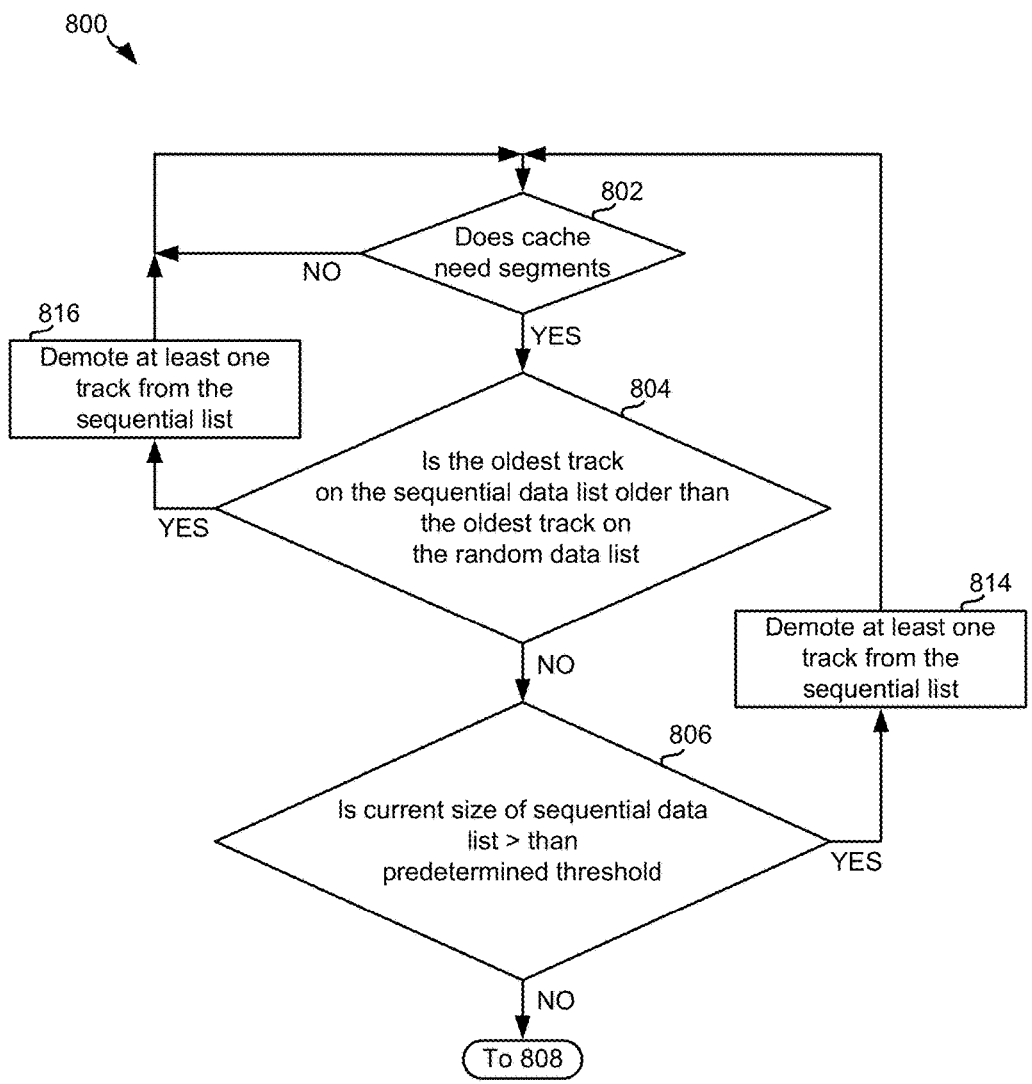
FIG. 8 illustrates a flowchart of a method for partitioning cache tracks due to the cache needing segments, in accordance with one embodiment.

Now referring to FIG. 8, a flowchart of a method 800 for partitioning cache tracks due to the cache needing segments is shown according to one embodiment. The method 800 may be performed in accordance with the present invention in any of the environments depicted in FIGS. 1-5, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

Referring to FIGS. 8 and 5, determination 802 includes determining if the cache needs segments. The cache may be found to need segments in response to, e.g., an accessing of tracks that are not stored in the current random data list 512 and/or the current sequential data list 514, the current size of the sequential data list 514 and/or the current size of the random data list 512 not being preferred, the cache needing segments for a reason known in the art, etc.

In response to the cache not needing segments (as noted by the "NO" logic leading from determination 802) determination 802 may continue to be performed, e.g., until it is determined that the cache does need segments.

In response to the cache needing segments (as noted by the "YES" logic leading from determination 802), determination 804 may be performed to determine if a demotion should be made from the random data list 512, and/or the sequential data list 514. Determination 804 includes determining if the oldest track 516 on the sequential data list 514 is older than the oldest track 518 on the random data list 512. If the oldest track 516 on the sequential data list 514 is older than the oldest track 518 on the random data list 512, the sequential data list 514 may not include a preferred number of relatively recently accessed tracks. A sequential miss may occur in response to the sequential data list 514 not including a preferred number of relatively recently accessed tracks.

If it is determined that the oldest track 516 on the sequential data list 514 is older than the oldest track 518 on the random data list 512 (as noted by the "YES" logic leading from determination 802) operation 816 may be performed. Operation 816 includes demoting an oldest track from the sequential list. According to further embodiments, one or more tracks other than the oldest track from the sequential list may also be demoted. A demotion from the sequential data list 514 may decrease the probability of a sequential miss occurring, due to sequential data list 514 less "older" (and thereby less likely to be a hit on a sequential hit) tracks as a result of the demotion. It should be noted that demotions from the sequential data list 514 and/or the random data list 512 described herein may include a single track demotion or more than one track demotion, depending on the embodiment.

In response to determining that the oldest track 516 on the sequential data list 514 is not older than the oldest track 518 on the random data list 512 (as noted by the "NO" logic leading from determination 804), determination 806 may be performed.

Determination 806 includes determining if a current size of the sequential data list is greater than a predetermined threshold. According to various embodiments, the predetermined threshold may preferably be 50% of the cache, but may vary according to further embodiments.

If it is determined that the current size of the sequential data list 514 is greater than a predetermined threshold (as noted by the "YES" logic leading from determination 806) operation 814 may be performed. Operation 814 includes demoting at least one track from the sequential data list 514. Demoting at least one track from the sequential data list 514 in response to the current size of the sequential data list 514 being determined to be greater than a predetermined threshold may ensure that the sequential data list 514 does not contain too may data tracks. A larger than desirable number of data tracks in the sequential data list 514 and/or the random data list 512 may decrease cache performance, e.g., due to increased access request search times, due to track containing stale data, due to cache performance issues of a type known in the art, etc.

In response to determining that the current size of the sequential data list 514 is not greater than a predetermined threshold (as noted by the "NO" logic leading from determination 806), determination 808 may be performed.

Determination 808 includes determining if there been a predetermined number of demotions since the last scheduled predetermined demotion.

In response to it being determined that there has been a predetermined number of demotions since the last scheduled predetermined demotion, (as noted by the "YES" logic leading from determination 808) operation 818 may be performed. Operation 818 includes demoting at least one track from the list having the oldest track one time. For example, according to various embodiments, at least one track may be demoted from the list having the oldest track one time per a predetermined number of demotions, e.g., once every 25 demotions, once every 50 demotions, once any number of demotions.

According to further embodiments, more than one track may be demoted when it is determined that there has been a predetermined number of demotions since the last scheduled predetermined demotion. Demoting at least one track from the list having the oldest track one time per a predetermined number of demotions may remove "stale" (the oldest track(s) which have a small probability of being accessed) data from the random data list 512 and/or the sequential data list 514.

In response to it being determined that there has not been a predetermined number of demotions since the last scheduled predetermined demotion, (as noted by the "NO" logic leading from determination 808) determination 810 may be performed.

Determination 810 includes determining if a current sequential data list size is less than the desired size 510 of the sequential data list 514.

If it is determined that the current sequential data list size is less than the desired size 510 of the sequential data list 514 (as noted by the "YES" logic leading from determination 810) operation 820 may be performed.

Operation 820 includes demoting at least one track from the random data list 512. As previously mentioned, the desired size 510 may establish a minimum size of the sequential data list 514, e.g. a minimum size before the sequential data list 514 is demoted to a size that causes an increase in the miss ratio, and therefore determination 810 may be used to detect and/or prevent such issues by providing the sequential data list 514 with one or more demoted tracks from the random data list 512.

In response to determining that the current sequential data list size is not less than the desired size 510 of the sequential data list 514 (as noted by the "NO" logic leading from determination 810), determination 812 may be performed.

Determination 812 includes determining if the current sequential data list size is greater than the desired size 510 of the sequential data list 514. If the current sequential data list size is greater than the desired size 510 of the sequential data list 514, the sequential data list 514 may be able to afford (be able to provide a demotion without causing a decrease in the performance of the cache) a demotion of a data track when the random data list 512 is in need of tracks.

Accordingly, in response to determining that the current sequential data list size is greater than the desired size 510 of the sequential data list 514 (as noted by the "YES" logic leading from determination 812) operation 822 may be performed, which includes demoting at least one track from the sequential data list 514.

Alternatively, in response to determining that the current sequential data list size is not greater than the desired size 510 of the sequential data list 514 (as noted by the "NO" logic leading from determination 812), decision 802 may be performed to determine if the cache is still in need of segments.

Note that the order of operations in FIG. 8 may vary in other embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for caching data, comprising:
   maintaining a random data list and a sequential data list;
   dynamically establishing a desired size of the sequential data list,
   wherein dynamically establishing the desired size of the sequential data list includes increasing the desired size of the sequential data list in response to an event selected from the group consisting of: detecting a hit on a bottom of the sequential data list, and detecting a read miss on sequential tracks,
   wherein dynamically establishing the desired size of the sequential data list includes decreasing the desired size of the sequential data list in response to detecting a hit on a bottom of the random data list; and
   demoting at least one track from the list having the oldest track one time every predetermined number of demotions.

2. The method of claim 1, wherein the bottom of the random data list is in a bottom percentile of the random data list, wherein the bottom percentile of the random data list is predefined by at least one source selected from a group of sources consisting of a user, a vendor, and performance characteristics.

3. The method of claim 1, wherein the bottom of the sequential data list is in a bottom percentile of the sequential data list, wherein the bottom of the sequential data list is in a range of less than or equal to a bottom 2% of tracks of the sequential data list.

4. The method of claim 1, comprising demoting at least an oldest track from the sequential data list when the oldest track on the sequential data list is older than the oldest track on the random data list.

5. The method of claim 1, comprising demoting at least one track from the sequential data list in response to determining that a current size of the sequential data list is greater than a predetermined threshold, wherein the predetermined threshold is 50% of a cache storing data associated with the random data list and the sequential data list.

6. The method of claim 1, comprising demoting at least one track from the random data list in response to determining that a current sequential data list size is less than the desired size of the sequential data list, wherein the determining is performed in response to determining that there has not been a predetermined number of demotions since a last scheduled predetermined demotion.

7. The method of claim 1, comprising demoting at least one track from the sequential data list in response to determining that a current sequential data list size is greater than the desired size of the sequential data list, wherein the desired size of the sequential data list corresponds to a minimum size of the sequential data list before the sequential data list is demoted to a size that results in an increase in a miss ratio associated with a cache performance of a cache storing data associated with the random data list and the sequential data list.

8. A computer program product for cache size prioritization, the computer program product comprising a computer readable storage medium having program instructions embodied therewith, the program instructions readable and/or executable by a computer to cause the computer to:
   maintain, by the computer, a random data list and a sequential data list;
   dynamically establish, by the computer, a desired size of the sequential data list,
   wherein dynamically establishing the desired size of the sequential data list includes increasing the desired size of the sequential data list in response to at least one event selected from the group consisting of: detecting a hit on a bottom of the sequential data list, and detecting a read miss on sequential tracks,
   wherein dynamically establishing the desired size of the sequential data list includes decreasing the desired size of the sequential data list in response to detecting a hit on a bottom of the random data list; and
   demote at least one track from the list having the oldest track one time every predetermined number of demotions.

9. The computer program product of claim 8, wherein the bottom of the random data list is in a bottom percentile of the random data list, wherein the bottom of the random data list is in about a bottom 5% of tracks of the random data list.

10. The computer program product of claim 8, wherein the bottom of the sequential data list is in a bottom percentile of the sequential data list, wherein the bottom percentile of the sequential data list is predefined by at least one source selected from a group of sources consisting of a user, a vendor, and performance characteristics.

11. The computer program product of claim 8, comprising program instructions readable and/or executable by the computer to cause the computer to demote at least an oldest track from the sequential data list when the oldest track on the sequential data list is older than the oldest track on the random data list.

12. The computer program product of claim 8, comprising program instructions readable and/or executable by the computer to cause the computer to demote at least one track from the sequential data list in response to determining that a current size of the sequential data list is greater than a predetermined threshold, wherein the predetermined threshold is 50% of a cache storing data associated with the random data list and the sequential data list.

13. The computer program product of claim 8, comprising program instructions readable and/or executable by the computer to cause the computer to demote at least one track from the random data list in response to determining that a current sequential data list size is less than the desired size of the sequential data list, wherein the determining is performed in response to determining that there has not been a predetermined number of demotions since a last scheduled predetermined demotion.

14. The computer program product of claim 8, comprising program instructions readable and/or executable by the computer to cause the computer to demote at least one track from the sequential data list in response to determining that a current sequential data list size is greater than the desired size of the sequential data list, wherein the desired size of the sequential data list corresponds to a minimum size of the sequential data list before the sequential data list is demoted to a size that results in an increase in a miss ratio associated with a cache performance of a cache storing data associated with the random data list and the sequential data list.

15. A system, comprising:
a cache comprising memory; and
a processor and logic integrated with the processor, executable by the processor, or integrated with and executable by the processor, the logic being configured to:
maintain a random data list and a sequential data list;
dynamically establish a desired size of the sequential data list,
wherein dynamically establishing the desired size of the sequential data list includes increasing the desired size of the sequential data list in response to at least one event selected from the group consisting of: detecting a hit on a bottom of the sequential data list, and detecting a read miss on sequential tracks,
wherein dynamically establishing the desired size of the sequential data list includes decreasing the desired size of the sequential data list in response to detecting a hit on a bottom of the random data list; and
demote at least one track from the list having the oldest track one time every predetermined number of demotions.

16. The method of claim 5, wherein the determining is performed in response to determining that the oldest track on the sequential data list is not older than the oldest track on the random data list.

17. The method of claim 1, comprising:
demoting at least an oldest track from the sequential data list when the oldest track on the sequential data list is older than the oldest track on the random data list;
demoting at least one track from the sequential data list in response to determining that a current size of the sequential data list is greater than a predetermined threshold,
wherein the predetermined threshold is 50% of a cache storing data associated with the random data list and the sequential data list;
demoting at least one track from the random data list in response to determining that a current sequential data list size is less than the desired size of the sequential data list,
wherein the determining is performed in response to determining that there has not been a predetermined number of demotions since a last scheduled predetermined demotion; and
demoting at least one track from the sequential data list in response to determining that a current sequential data list size is greater than the desired size of the sequential data list,
wherein the desired size of the sequential data list corresponds to a minimum size of the sequential data list before the sequential data list is demoted to a size that results in an increase in a miss ratio associated with a cache performance of the cache;
wherein the bottom of the random data list is in a bottom percentile of the random data list,
wherein the bottom of the random data list is in about a bottom 5% of tracks of the random data list,
wherein the bottom percentile of the random data list is predefined by at least one source selected from a group of sources consisting of a user, a vendor, and performance characteristics,
wherein the bottom percentile of the sequential data list is predefined by at least one source selected from a group of sources consisting of a user, a vendor, and performance characteristics,
wherein the bottom of the sequential data list is in a bottom percentile of the sequential data list,
wherein the bottom of the sequential data list is in a range of less than or equal to a bottom 2% of tracks of the sequential data list.

18. The computer program product of claim 8, comprising program instructions readable and/or executable by the computer to cause the computer to:
demote at least an oldest track from the sequential data list when the oldest track on the sequential data list is older than the oldest track on the random data list;
demote at least one track from the sequential data list in response to determining that a current size of the sequential data list is greater than a predetermined threshold,
wherein the predetermined threshold is 50% of a cache storing data associated with the random data list and the sequential data list;
demote at least one track from the random data list in response to determining that a current sequential data list size is less than the desired size of the sequential data list,
wherein the determining is performed in response to determining that there has not been a predetermined number of demotions since a last scheduled predetermined demotion;
demote at least one track from the sequential data list in response to determining that a current sequential data list size is greater than the desired size of the sequential data list,
wherein the desired size of the sequential data list corresponds to a minimum size of the sequential data list before the sequential data list is demoted to a size that results in an increase in a miss ratio associated with a cache performance of the cache; and
demote at least one track from the sequential data list in response to determining that a current size of the sequential data list is greater than a predetermined threshold,
wherein the predetermined threshold is 50% of the cache,
wherein the bottom of the random data list is in a bottom percentile of the random data list,
wherein the bottom of the random data list is in about a bottom 5% of tracks of the random data list,
wherein the bottom percentile of the random data list is predefined by at least one source selected from a group of sources consisting of a user, a vendor, and performance characteristics,
wherein the bottom of the sequential data list is in a bottom percentile of the sequential data list,
wherein the bottom of the sequential data list is in a range of less than or equal to about a bottom 5% of tracks of the sequential data list,
wherein the bottom percentile of the sequential data list is predefined by at least one source selected from a group of sources consisting of a user, a vendor, and performance characteristics.

* * * * *